United States Patent
Kalley et al.

(10) Patent No.: US 8,402,089 B2
(45) Date of Patent: Mar. 19, 2013

(54) COMMUNICATING MULTIMEDIA INFORMATION TO RESPONDENT ENDPOINTS

(75) Inventors: Yogesh Kalley, Sunnyvale, CA (US); Glenn T. Inn, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 1192 days.

(21) Appl. No.: 11/121,147

(22) Filed: May 3, 2005

(65) Prior Publication Data

US 2006/0253531 A1    Nov. 9, 2006

(51) Int. Cl.
G06F 15/16    (2006.01)
H04M 3/00    (2006.01)
(52) U.S. Cl. .................................. 709/204; 379/265.02
(58) Field of Classification Search .................. 709/204, 709/205; 379/265
See application file for complete search history.

(56) References Cited

U.S. PATENT DOCUMENTS

| | | | | |
|---|---|---|---|---|
| 2002/0184346 | A1* | 12/2002 | Mani | 709/220 |
| 2003/0074474 | A1* | 4/2003 | Roach et al. | 709/246 |
| 2004/0103165 | A1 | 5/2004 | Nixon et al. | 709/217 |
| 2004/0221010 | A1* | 11/2004 | Butler | 709/204 |
| 2005/0076128 | A1* | 4/2005 | Tsai | 709/227 |

FOREIGN PATENT DOCUMENTS

WO    WO 02/35384 A2    5/2002

OTHER PUBLICATIONS

Wireless Pacific, RDX3588™, Rapid Deployment X-Ponder, www.wirelesspac.com, © 2002 Wireless Pacific Ltd., 4 pages, 2002.
Cisco MeetingPlace 5.3, Data Sheet, Cisco Systems, Inc., www.cisco.com, Copyright © 2004, Cisco Systems, Inc., 14 pages, 2004.
Cisco MeetingPlace Managed Solutions, Overview, Cisco Systems, Inc., www.cisco.com, Copyright © 2004, Cisco Systems, Inc., 9 pages, 2004.
Windows NetMeeting, Features/Video and Audio Conferencing/Remote Desktop Sharing/Program Sharing, Microsoft Windows Technologies, www.microsoft.com/windows/netmeeting/features, Copyright © 2005 Microsoft Corporation, 5 pages, 2005.
Harroud et al., "SIP-based Agent Architecture for Collaborative Applications," IEEE, pp. 518-521, 2003.
International Search Report for PCT/US2006/015937, 12 pages, Sep. 13, 2006.

* cited by examiner

*Primary Examiner* — Djenane Bayard
*Assistant Examiner* — Thomas Richardson
(74) *Attorney, Agent, or Firm* — Baker Botts L.L.P.

(57) ABSTRACT

Communicating information to respondent endpoints includes detecting a trigger event for an incident. The trigger event is related to an incident category for the incident. A rule is identified in accordance with the incident category. The rule specifies one or more processes for responding to the incident. A collaboration session with a first respondent endpoint and a second respondent endpoint is established in accordance with the rule. The first respondent endpoint is associated with a first respondent system, the second respondent endpoint is associated with a second respondent system. Multimedia information is communicated to the first respondent endpoint and the second respondent endpoint according to the rule.

19 Claims, 2 Drawing Sheets

COMMUNICATING MULTIMEDIA INFORMATION TO RESPONDENT ENDPOINTS

TECHNICAL FIELD

This invention relates generally to the field of communications and more specifically to communicating multimedia information to respondent endpoints.

BACKGROUND

Emergency situations typically require communication of information between a dispatcher and one or more respondents. A dispatcher may notify the respondents of the emergency situation, and may also provide the respondents with information that the respondents can use to respond to the situation.

Known techniques for providing information include radio communication. The dispatcher and the respondents communicate via a radio communications system, such as a two-way radio communications system. Radio communication, however, may not be able to communicate certain types of information. It is generally desirable to communicate certain types of information.

SUMMARY OF THE DISCLOSURE

In accordance with the present invention, disadvantages and problems associated with previous techniques for providing information to respondent endpoints may be reduced or eliminated.

According to one embodiment of the present invention, communicating information to respondent endpoints includes detecting a trigger event for an incident. The trigger event is related to an incident category for the incident. A rule is identified in accordance with the incident category. The rule specifies one or more processes for responding to the incident. A collaboration session with a first respondent endpoint and a second respondent endpoint is established in accordance with the rule. The first respondent endpoint is associated with a first respondent system, the second respondent endpoint is associated with a second respondent system. Multimedia information is communicated to the first respondent endpoint and the second respondent endpoint according to the rule.

Certain embodiments of the invention may provide one or more technical advantages. A technical advantage of one embodiment may be that multimedia information may be communicated to respondent endpoints in real time. Communicating multimedia information in real time may allow for respondent endpoints to more effectively respond to an incident.

Another technical advantage of one embodiment may be that a collaboration server may launch an application to provide information to respondent endpoints. The respondent endpoints are not required to launch the application to receive information. Yet another technical advantage of one embodiment may be that an incident command server may initiate a series of processes in response to detecting a trigger event that includes receiving a notification from dispatcher endpoint.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
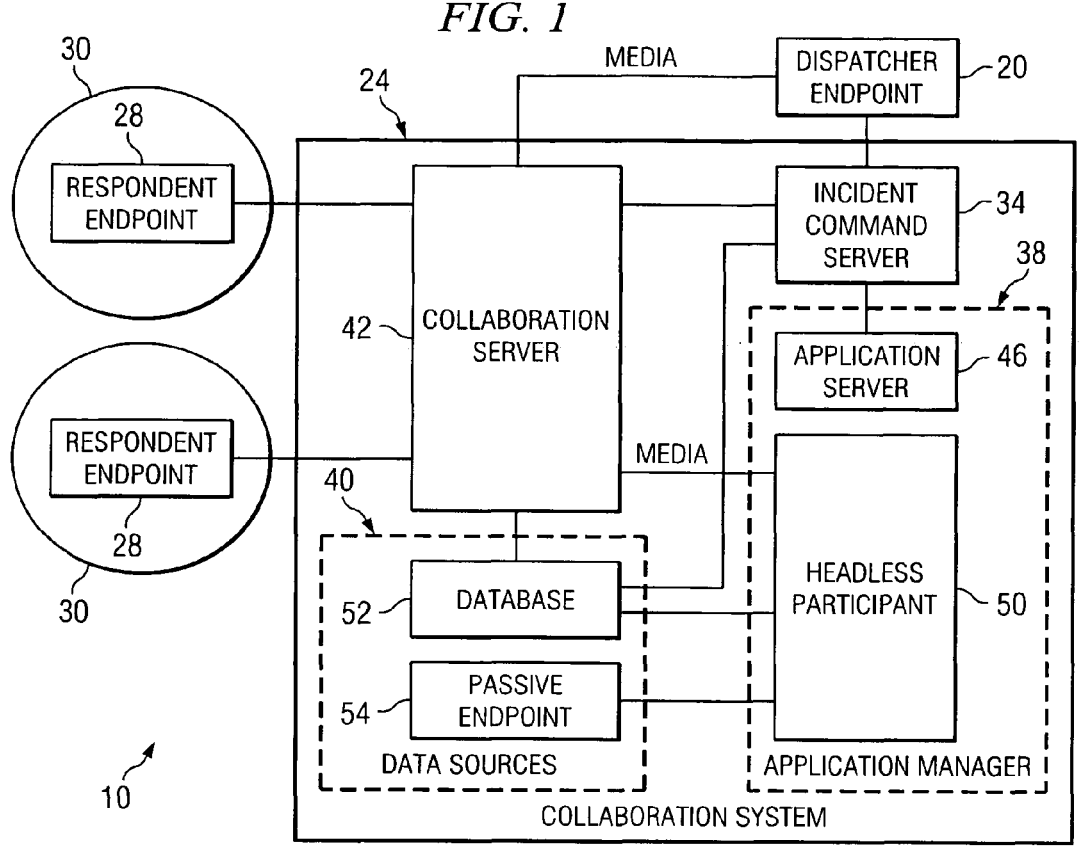
FIG. 1 is a block diagram illustrating one embodiment of a network operable to communicate multimedia information to respondent endpoints.

FIG. 1 is a block diagram illustrating one embodiment of a network 10 operable to communicate multimedia information to respondent endpoints. In general, network 10 may include a collaboration server that communicates multimedia information to respondent endpoints. The collaboration server may provide information to the respondent endpoints even if the respondent endpoints do not have the application to access the information. Network 10 may also include an incident command server that initiates a series of processes in response to detecting a trigger event, which may comprise receiving a notification from a dispatcher endpoint. Accordingly, the dispatcher endpoint may only need to provide a single notification to initiate the processes.

The collaboration server and the incident command server may operate to automatically gather and provide information about an incident. The information may be gathered from multiple types of sources and provided to endpoints in accordance with the context of the incident. The context may refer to a response to an incident that is predefined at the incident command server. The collaboration server and the incident command server may be used to automate operating procedures in applications such as public safety, transportation, and finance applications.

An incident may refer to an occurrence that requires a response from respondent endpoints 28. According to one embodiment, an incident may refer to an occurrence, such as a fire or an injury, that may require an emergency response. An incident may be associated with an incident category for the incident and incident data describing the incident.

An incident category describes the type of incident, and may be further subdivided into different categories. For example, incident categories may include a medical, property, criminal, military, transportation, or other incident category, or any combination of the preceding. A medical incident category may describe incidents that invoke a medical response, and may include categories representing a health emergency, injury, or death.

A property incident category may describe incidents that invoke a response to protect property, and may include categories representing fire, severe weather, or building failure. A criminal incident category may describe incidents that invoke a law enforcement response, and may include categories representing homicide, burglary, or vandalism. A military incident category may describe incidents that invoke a military response, and may include categories representing a terrorist attack. A transportation incident category may describe incidents that invoke a response to control transportation, and may include categories representing a traffic accident.

Incident data describes a particular incident. Incident data may include the location of the incident, the time of the incident, an incident identifier that uniquely identifies the incident, or other suitable information.

According to one embodiment, network 10 allows communication devices to communicate with other networks or devices. Network 10 may comprise all or a portion of a public switched telephone network (PSTN), a public or private data network, a local area network (LAN), a metropolitan area network (MAN), a wide area network (WAN), a global communication network such as the Internet, a wireline or wireless network, an enterprise intranet, other suitable communication link, or any combination of the preceding.

Network 10 may communicate information in packets. A packet may comprise a bundle of data organized in a specific way for transmission, and a frame may comprise the payload of one or more packets organized in a specific way for transmission. A packet may carry any suitable information such as video, audio, telephony, text, graphics, facsimile, data, instant messaging (IM), presence, other information, or any combination of the preceding. Network 10 may utilize Internet Protocol (IP) or IP-enabled technology. For example, the collaboration server and the incident command server may utilize IP or IP-enabled technology to send or receive packets from IP or non-IP endpoints.

According to the illustrated embodiment, network 10 includes a dispatcher endpoint 20, a collaboration system 24, and respondent endpoints 28 of respondent systems 30. In operation, collaboration system 24 may detect a trigger event, which may be initiated by dispatcher endpoint 20 or other node. In response, collaboration system 24 sends multimedia information pertaining to the incident to respondent endpoints 28.

Dispatcher endpoint 20 comprises any suitable endpoint operable to send a notification to initiate a trigger event for an incident. In general, an endpoint may comprise any hardware or software or combination of both operable to communicate with collaboration system 24. For example, an endpoint may comprise a cellular telephone, a computer such as a laptop or desktop, a personal digital assistant (PDA), a handheld device, a push-to-talk (PTT) device, a mobile handset, a radio frequency device, or any other device suitable for communicating data packets to and from collaboration system 24.

An endpoint may have any suitable input, output, or both input and output devices. As an example, an endpoint may have a keyboard, a microphone, a camera, a speaker, a display, a monitor, or any other device suitable for receiving input, providing output, or both receiving input and providing output. An endpoint may support, for example, Internet Protocol, voice over Internet Protocol (VOIP), or any other suitable communication protocol, and may utilize any other suitable wireless or wireline communication technology.

Dispatcher endpoint 20 sends a notification of an incident to collaboration system 24. The notification for an incident may include an incident category for the incident and incident data describing the incident. According to one embodiment, dispatcher endpoint 20 may allow a user, such as a dispatcher, to invoke a series of response processes using a minimum number of notification commands. A user may send a notification with a single command. For example, dispatcher endpoint 20 may have a touch screen that the user may use to select a command to send the notification. Dispatcher endpoint 20 may also verify if a user is authorized to invoke a particular command. The notification initiates an incident response that includes several processes.

Although the embodiment describes a user initiating a notification, a notification may be initiated in any suitable manner. For example, dispatcher endpoint 20 may automatically receive a notification from another communication system.

Collaboration system 24 provides multimedia information during a collaboration session. A collaboration session may refer to a call session among participants during which multimedia information may be provided. Collaboration system 24 detects a trigger event for the incident and provides multimedia information to respondent endpoints 28 in response to the trigger event. A trigger event for an incident may refer to an event that triggers a specific response to the incident. The trigger event may provide information about the incident, such as an incident category for the incident and incident data describing the incident. According to one embodiment, the trigger event may comprise a notification from dispatcher endpoint 20 or other node. According to one embodiment, the trigger event may comprise a particular type of input received from a node.

According to the illustrated embodiment, collaboration system 24 includes an incident command server 34, an application manager 38, data sources 40, and a collaboration server 42. Incident command server 34 detects a trigger event for the incident and accesses business logic that specifies response to the incident. The business logic may include rules that specify a series of processes to be implemented in response to the trigger event of an incident. For example, the rules may be used to notify respondent endpoints 28 to engage collaboration, launch applications from application manager 38, retrieve data from data sources 40, perform any other suitable process, or any suitable combination of the preceding. As an example, a rule may state that if a trigger event of a fire at a building is received, contact firefighter respondent endpoints 28, launch a display application at application manager 38, and retrieve blueprints of the building from data sources 40. An example embodiment of incident command server 34 is described in more detail with reference to FIG. 2.

Application manager 38 manages applications that may be used by collaboration server 42 to provide information to respondent endpoints 28. An application may refer to a software program. According to the illustrated embodiment, application manager 38 may include an application server 46 and a headless participant 50. Application server 46 stores and launches applications that may be used by collaboration server 42. The applications may include bandwidth intensive applications or third party applications that may be difficult for collaboration server 42 to store. For example, applications may include word processing, slide presentation, blueprint viewing, map location, database, web browser, or other application, or any combination of the preceding. For example, the applications may include a video surveillance application that may control a surveillance camera using remote pan, tilt, and zoom (PTZ) operations.

Application server 46 may be used to store applications that can be launched by incident command server 34 through an application programming interface (API). Control parameters may be used to designate the privileges that users may have to launch applications stored at application server 46.

Headless participant 50 may provide applications and data from data sources 40 to collaboration server 42. Control parameters may be used to designate the privileges that users may have to the data or applications. Headless participant 50 may launch applications in response to a request from incident command server 34. Headless participant 50 may be invited to be a virtual participant in the collaboration session, or may be invited to drop into a data collaboration mode.

Data sources 40 provides data to collaboration server 42. The data may include any suitable data that may be used by respondent endpoints 30 to respond to an incident. For example, data may include medical records, street maps, blueprints, hazardous material information, disabled person information, first aid information, law enforcement records, status reports, or other information. The data may be stored as data files that may be opened by specific applications.

Data sources 40 include a database 52 and a passive endpoint 54. Database 52 stores data. Database 52 may include any hardware or software or combination of hardware and software for storing and facilitating retrieval of the data. Also, database 52 may use any of a variety of data structures, arrangements, and compilations to store and facilitate retrieval of the data.

Passive endpoint 54 may refer to an endpoint that passively receives information to send to collaboration server 42. For example, a passive endpoint 54 may comprise a surveillance camera, an alarm, a sensor, a radio frequency identifier detector, other passive device, or any combination of the preceding. Typically, a passive endpoint 28c may send information to collaboration server 42, but may not be required to receive multimedia information. A passive endpoint 28c may be activated in response to detecting certain triggers. The trigger may initiate a call to dispatcher endpoint or directly to collaboration server 42.

Collaboration server 42 retrieves and receives multimedia information and provides the multimedia information to participants such as dispatcher endpoint 20 and respondent endpoints 28. According to one embodiment, collaboration engine 100 may comprise, for example, a CISCO MEETINGPLACE server, provided by CISCO SYSTEMS, INC. Multimedia information may include video, audio, telephony, text, graphics, facsimile, data, other information, or any combination of the preceding. Collaboration server 42 may provide information generated from data to respondent endpoints 28 even if respondent endpoints 28 do not have the application to access the data. An example embodiment of collaboration server 42 is described in more detail with reference to FIG. 3.

A respondent endpoint 28 of a respondent system 30 may refer to an endpoint that a user responding to an incident may use to receive and transmit information about the incident. As an example, respondent endpoint 28 may represent a device used by emergency personnel responding to an emergency. A respondent system 30 may refer to the communication system used by the user. As an example, respondent system 30 may represent the communication system used by fire, law enforcement, security, medical, military, other emergency personnel, or any combination of the preceding.

Respondent endpoints 28 may comprise thin clients since respondent endpoints 28 are not required to store certain applications for accessing certain types of data. Respondent endpoints 28 may also have various features that facilitate access to the multimedia information. As another example, respondent endpoints 28 may automatically display a user interface that allows a user to efficiently access the information.

Respondent endpoint 28 may have any suitable application sharing portal. According to one embodiment, dispatcher endpoint 20 may provide respondent endpoints 28 with an incident identifier. Respondent endpoint 28 may use the incident identifier to retrieve the application sharing portal.

According to another embodiment, respondent endpoints 28 may have a subscriber stub that polls application server 46. A portal page may be pushed to respondent endpoint 28 when dispatcher endpoint 20 initiates a collaboration session. The subscriber stub may receive information in an active mode or a passive mode. The subscribe stub may receive information in real time in the active mode. In the passive mode, a pointer to the information is updated in the stub. Respondent endpoint 28 may use the pointer to access the collaboration information when needed.

Modifications, additions, or omissions may be made to network 10 without departing from the scope of the invention. For example, network 10 may include a web application that may be used to manage the servers of network 10. The web application may also aid the graphical user interface of dispatcher endpoint 30 with integration of multimedia services.

The components of network 10 may be integrated or separated according to particular needs. Moreover, the operations of network 10 may be performed by more, fewer, or other modules. For example, the operations of application server 46 and headless participant 50 may be performed by one module, or the operations of incident command server 34 may be performed by more than one module. Additionally, operations of network 10 may be performed using any suitable logic comprising software, hardware, other logic, or any suitable combination of the preceding.

Figure 2:
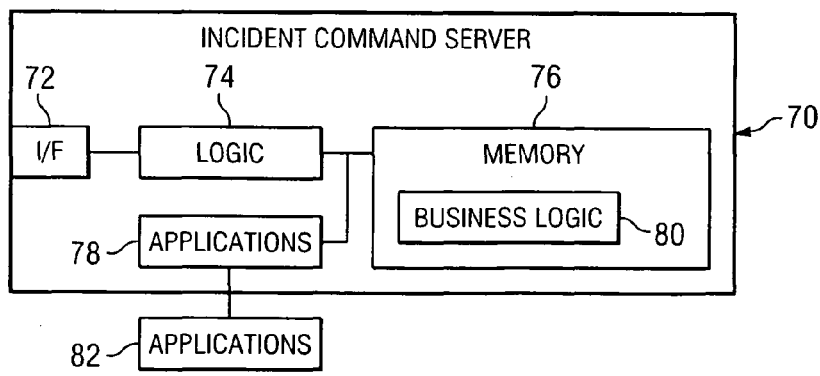
FIG. 2 is a block diagram illustrating one embodiment of an incident command server that may be used with the collaboration system of FIG. 1.

FIG. 2 is a block diagram illustrating one embodiment of an incident command server 70 that may be used with the collaboration system of FIG. 1. According to the embodiment, incident command server 70 receives a trigger event of the incident and accesses business logic that specifies response to the incident.

According to the illustrated embodiment, incident command server 70 includes an interface (I/F) 72, logic 74, a memory 76, and one or more applications 78 coupled as shown. Interface 72 receives and sends data. An interface may refer to any suitable structure of a device operable to receive input for the device, send output from the device, or both, and may comprise one or more ports. Logic 74 manages the operation of incident command server 70. Logic 74 may be embodied in a non-transitory medium and may comprise any suitable hardware, software, or combination of hardware and software. For example, logic 74 may include a processor. A processor may refer to any suitable device operable to execute instructions and manipulate data to perform operations.

Memory 76 stores and facilitates retrieval of information used by logic 74. Memory may refer to any structure operable to store and facilitate retrieval of information used by logic 74, and may comprise Random Access Memory (RAM), Read Only Memory (ROM), magnetic drives, disk drives, Compact Disk (CD) drives, Digital Video Disk (DVD) drives, removable media storage, any other suitable data storage device, or any combination of the preceding.

According to the illustrated embodiment, memory 76 includes business logic 80. Business logic 80 may include rules. A rule may define a series of processes to be performed in response to an incident. A rule for an incident may be mapped to the incident by, for example, incident category for the incident, incident data describing the incident, or other aspect of the incident. Mapping the rule to the incident may allow incident command server 70 to identify the response to a particular incident.

According to one embodiment, a rule may specify parameters for performing the response, such as respondent endpoints 28 to contact, applications to launch, data to retrieve, other procedure, or any combination of the preceding. Respondent endpoints 28 to contact may refer to respondent endpoints 28 with which to open a collaboration session. The applications to launch may refer to applications to launch to provide multimedia information to respondent endpoints 28. The data to retrieve may refer to data to retrieve from data sources 40 to provide to respondent endpoints 28.

A rule may designate other parameters for performing the response. For example, a rule may specify authorized users, channels for the collaboration session, other parameter, or any combination of the preceding. The authorized users may represent users who are authorized to receive information about the incident. The channels may refer to radio channels that may be used to communicate information regarding the incident.

Applications 78 may include application programming interface (API) or software development kit (SDK) applications 82 that manage systems. Applications 82 may include software for managing closed circuit televisions (CCTVs), building management systems, contact closure devices, alarms, sensors, public address systems, emergency systems, other system, or any combination of the preceding.

Modifications, additions, or omissions may be made to incident command server 70 without departing from the scope of the invention. Interface 72, logic 74, memory 76, and applications 78 may be integrated or separated according to particular needs. For example, the present invention contemplates the functions of both logic 74 and memory 76 being provided using a single device. If any components are separated, the separated components may be coupled using a wireline, wireless, or other suitable link. Moreover, the operations of incident command server 70 may be performed by more, fewer, or other modules. Additionally, operations of incident command server 70 may be performed using any suitable logic software, hardware, other logic, or any suitable combination of the preceding.

Figure 3:
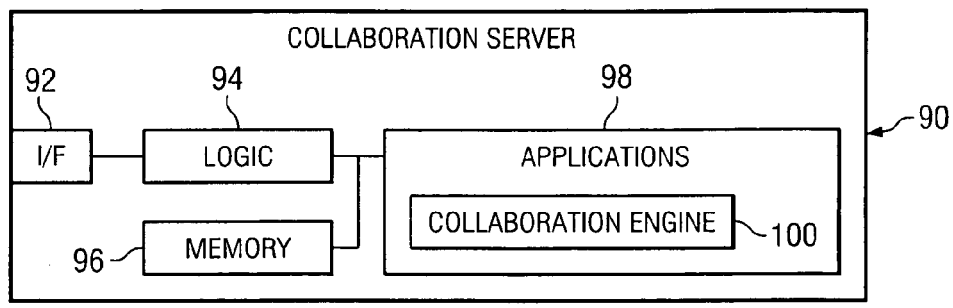
FIG. 3 is a block diagram illustrating one embodiment of a collaboration server that may be used with the collaboration system of FIG. 1.

FIG. 3 is a block diagram illustrating one embodiment of a collaboration server 90 that may be used with the collaboration system of FIG. 1. Collaboration server 90 retrieves and receives multimedia information and provides the multimedia information to endpoints such as dispatcher endpoint 20 and respondent endpoints 28.

According to the illustrated embodiment, collaboration server 90 includes an interface (I/F) 92, logic 94, memory 96, and one or more applications 98 coupled as shown. Interface 92 receives and sends data. Logic 94 manages the operation of collaboration server 90, and may comprise any suitable hardware, software, or combination of hardware and software. For example, logic 94 may include a processor. Memory 96 stores and facilitates retrieval of information used by logic 94.

According to one embodiment, applications 98 include a collaboration engine 100. Collaboration engine 100 retrieves and receives streams of information, mixes the streams, and provides the streams to participants. A media stream may refer to a flow of digital information. Collaboration engine 100 may perform any suitable process for providing the streams. As an example, collaboration engine 100 may initiate or terminate a collaboration session with respondent endpoints 28. Collaboration engine 100 may also transfer control of one or more streams, such as a video stream, to an endpoint such as a respondent endpoint 28. As another example, collaboration engine 100 may identify the source of a stream. As yet another example, collaboration engine 100 may suppress a stream. As yet another example, collaboration engine 100 may translate between different communication techniques to communicate the information.

Collaboration engine 100 may receive the information to be communicated from any suitable source. For example, collaboration engine 100 may receive the information from a dispatcher endpoint 30, application manager 38, or respondent endpoints 28. For example, dispatcher endpoint 30 may provide incident data such as the location of the incident. Application manager 38 may provide street maps to the location. Respondent endpoint 28 may provide video information about the incident itself.

Collaboration engine 100 may provide information generated from data to respondent endpoints 28 even if respondent endpoints 28 do not have the application to access the data. Collaboration engine 100 may launch the application from application server 46, access the data using the application, and display the data to respondent endpoint 28. For example, a respondent endpoint 28 may not have a blueprint drafting application required to access blueprint data. Collaboration engine 100 may retrieve the blueprint drafting application from application server 46 and the blueprint data from database 52. Collaboration engine 100 may then open the blueprint data using the application and then provide the information to respondent endpoint 28.

Collaboration engine 100 may replicate and distribute information to participants in any suitable manner. According to one embodiment, a publisher such as application manager 38 or data sources 40 may have a publisher stub, and a subscriber such as an endpoint may have a subscriber stub. SyncML or other suitable protocol may be used to synchronize the distribution of the information between the publisher stubs and the subscriber stubs.

According to the embodiment, dispatcher endpoint 20 may designate headless participant 50 through incident command server 34. Incident command server 34 notifies collaboration engine 100 of the designation, which notifies headless participant 50. After receiving an acknowledgment of the configuration, collaboration engine 100 server may push the information to the participants. A subscriber stub obtains the information and invokes collaboration engine 100 to access shared information from headless participant 50. Collaboration engine 100 may also provide for remote parameter manipulation, configuration, content delivery, and security.

Modifications, additions, or omissions may be made to collaboration server 90 without departing from the scope of the invention. Interface 92, logic 94, memory 96, and applications 98 may be integrated or separated according to particular needs. For example, the present invention contemplates the functions of both logic 94 and memory 96 being provided using a single device. If any components are separated, the separated components may be coupled using a wireline, wireless, or other suitable link. Moreover, the operations of collaboration server 90 may be performed by more, fewer, or other modules. Additionally, operations of collaboration server 90 may be performed using any suitable logic software, hardware, other logic, or any suitable combination of the preceding.

Figure 4:
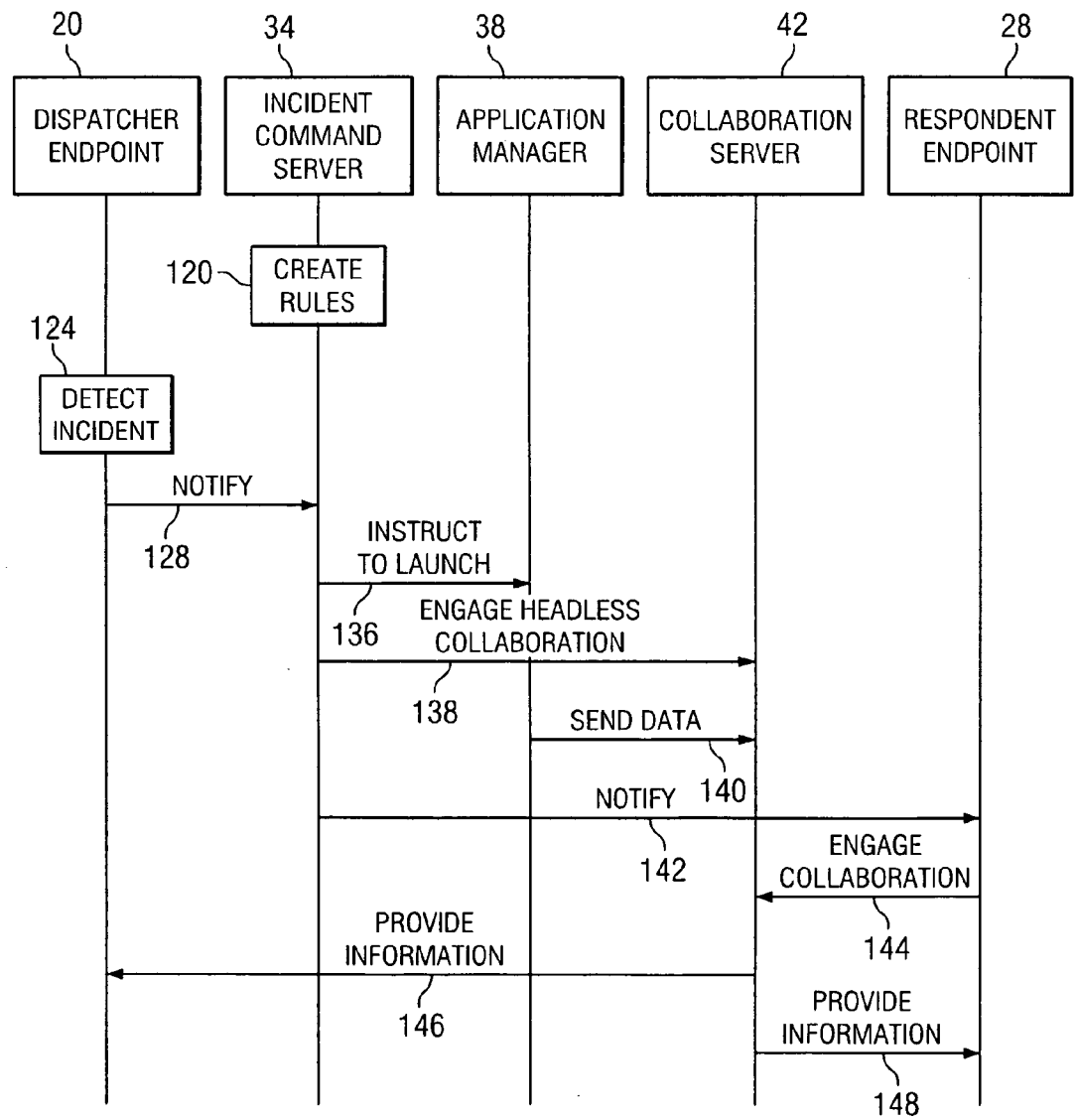
FIG. 4 is a call flow diagram illustrating one embodiment of a method for providing multimedia information to endpoints.

FIG. 4 is a call flow diagram illustrating one embodiment of a method for providing multimedia information to endpoints. The method begins at step 120, where rules are created. The rules specify processes implemented in response to an incident. Dispatcher 20 detects an incident at step 124. An incident may refer to an occurrence that requires an emergency response. Dispatcher 20 notifies incident command server 34 of the incident at step 128. The trigger event may be related to an incident category and incident data.

Incident command server 34 determines a response in accordance with the rules. Incident command server 34 may identify a rule that corresponds to the incident category, and determine the response from the rule. The rule may specify respondent endpoints 28 to engage collaboration, applications to launch from application manager 38, and data to retrieve from data sources 40.

Incident command server 34 requests that application manager 38 launch an application at step 136. In response, the application launched by application manager 38 processes the appropriate data. Incident command server 34 instructs collaboration server 42 to create a headless collaboration session at step 138. After the session starts, application manager 38 sends data from the application to collaboration server 42 at step 140. Incident command server 34 may notify respondents 28 of incident at step 142 as set forth in the rules. Respondents 28 engage in the collaboration session in step 144. Collaboration server 42 provides multimedia information to dispatcher 20 at step 146 and to respondents 28 at step 148. After providing the information, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that multimedia information may be communicated to respondent endpoints in real time. Communicating multimedia information in real time may allow for respondent endpoints to more effectively respond to an incident.

Another technical advantage of one embodiment may be that a collaboration server may launch an application to provide information to respondent endpoints. The respondent endpoints are not required to launch the application to receive information. Yet another technical advantage of one embodiment may be that an incident command server may initiate a series of processes in response to detecting a trigger event such as receiving a notification from dispatcher endpoint.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for communicating information to a plurality of respondent endpoints, comprising:
   detecting, by an incident command server comprising hardware and one or more processors, a trigger event for an incident requiring emergency assistance, the trigger event related to an incident category for the incident;
   identifying a rule in accordance with the incident category, wherein the rule is associated with at least one of a plurality of pre-defined incident categories, the rule specifying one or more processes for automatically gathering information for responding to the incident with emergency assistance, at least one of the one or more processes operable to automatically launch an application in response to detecting the trigger, the application operable to access a data file corresponding to multimedia information;
   establishing, by a collaboration server comprising hardware coupled to the incident command server, a collaboration session with participants in accordance with the rule, the participants including a first respondent endpoint and a second respondent endpoint, the first respondent endpoint associated with a first respondent system, the second respondent endpoint associated with a second respondent system, the first respondent system and the second respondent system configured to provide the emergency assistance to the incident; and
   collaborating to provide emergency assistance in response to the incident, the collaborating including:
   gathering a first stream of information and a second stream of information from at least two of the participants of the collaboration session;
   mixing, by a collaboration server, the first and second streams of information to yield multimedia information, the collaboration server distinct from the at least two participants;
   communicating multimedia information to the first respondent endpoint and the second respondent endpoint according to the rule; and
   transferring control of the first stream of information to the first respondent endpoint.

2. The method of claim 1, wherein communicating multimedia information to the first respondent endpoint and the second respondent endpoint further comprises transmitting a plurality of media streams to the first respondent endpoint and the second respondent endpoint, the plurality of media streams comprising at least one of:
   a video stream communicating video information;
   an audio stream communicating audio information; and
   a data stream communicating data information.

3. The method of claim 1, wherein communicating multimedia information to the first respondent endpoint and the second respondent endpoint further comprises:
   launching an application operable to access a data file corresponding to the multimedia information;
   accessing the data file using the application to generate the multimedia information; and
   sending the multimedia information to the first respondent endpoint and the second respondent endpoint.

4. The method of claim 1, wherein communicating multimedia information to the first respondent endpoint and the second respondent endpoint further comprises:
   accessing an application operable to open a data file in order to generate the multimedia information; and
   pushing the multimedia information to a first subscriber stub of the first respondent endpoint.

5. The method of claim 1, wherein the rule specifies the first respondent endpoint and the second respondent endpoint.

6. The method of claim 1, wherein:
   the rule specifies data to retrieve for the first respondent endpoint and the second respondent endpoint; and
   communicating multimedia information to the first respondent endpoint and the second respondent endpoint further comprises:
   retrieving the data to generate the multimedia information; and
   communicating the multimedia information.

7. A collaboration system for communicating information to a plurality of respondent endpoints, comprising:
   an incident command server comprising hardware, the incident command server comprising one or more processors operable to:
   detect a trigger event for an incident requiring emergency assistance, the trigger event related to an incident category for the incident; and
   identify a rule in accordance with the incident category, wherein the rule is associated with at least one of a plurality of pre-defined incident categories, the rule specifying one or more processes for automatically gathering information for responding to the incident with emergency assistance, at least one of the one or more processes operable to automatically launch an application in response to detecting the trigger, the application operable to access a data file corresponding to multimedia information; and a collaboration server comprising hardware coupled to the incident command server, the collaboration server operable to:

establish a collaboration session with participants in accordance with the rule, the participants including a first respondent endpoint and a second respondent endpoint, the first respondent endpoint associated with a first respondent system, the second respondent endpoint associated with a second respondent system, the first respondent system and the second respondent system configured to provide the emergency assistance to the incident;

collaborate to provide emergency assistance to the incident by:

gathering a first stream of information and a second stream of information from at least two of the participants of the collaboration session;

mixing, by the collaboration server, the first and second streams of information to yield multimedia information, the collaboration server distinct from the at least two participants;

communicating multimedia information to the first respondent endpoint and the second respondent endpoint according to the rule; and transferring control of the first stream of information to the first respondent endpoint.

8. The system of claim 7, the collaboration server operable to communicate multimedia information to the first respondent endpoint and the second respondent endpoint by transmitting a plurality of media streams to the first respondent endpoint and the second respondent endpoint, the plurality of media streams comprising at least one of:
a video stream communicating video information;
an audio stream communicating audio information; and
a data stream communicating data information.

9. The system of claim 7, the collaboration server operable to communicate multimedia information to the first respondent endpoint and the second respondent endpoint by:
launching an application operable to access a data file corresponding to the multimedia information;
accessing the data file using the application to generate the multimedia information; and
sending the multimedia information to the first respondent endpoint and the second respondent endpoint.

10. The system of claim 7, the collaboration server operable to communicate multimedia information to the first respondent endpoint and the second respondent endpoint by:
accessing an application operable to open a data file in order to generate the multimedia information; and
pushing the multimedia information to a first subscriber stub of the first respondent endpoint.

11. The system of claim 7, wherein the rule specifies the first respondent endpoint and the second respondent endpoint.

12. The system of claim 7, wherein:
the rule specifies data to retrieve for the first respondent endpoint and the second respondent endpoint; and
the collaboration server is operable to communicate multimedia information to the first respondent endpoint and the second respondent endpoint by:
retrieving the data to generate the multimedia information; and
communicating the multimedia information.

13. A non-transitory computer readable storage medium comprising logic, the logic, when executed by one or more processors, operable to:
detect, by an incident command server comprising hardware and one or more processors, a trigger event for an incident requiring emergency assistance the trigger event related to an incident category for the incident;
identify a rule in accordance with the incident category, wherein the rule is associated with at least one of a plurality of pre-defined incident categories, the rule specifying one or more processes for automatically gathering information for responding to the incident with emergency assistance, at least one of the one or more processes operable to automatically launch an application in response to detecting the trigger, the application operable to access a data file corresponding to multimedia information;
establish, by a collaboration server comprising hardware coupled to the incident command server, a collaboration session with a participants in accordance with the rule, the participants including a first respondent endpoint and a second respondent endpoint, the first respondent endpoint associated with a first respondent system, the second respondent endpoint associated with a second respondent system, the first respondent system and the second respondent system configured to provide the emergency assistance to the incident;
collaborate to provide emergency assistance in response to the incident by:
gathering a first stream of information and a second stream of information from at least two of the participants of the collaboration session;
mixing, by a collaboration server, the first and second streams of information to yield multimedia information, the collaboration server distinct from the at least two participants;
communicating multimedia information to the first respondent endpoint and the second respondent endpoint according to the rule; and
transferring control of the first stream of information to the first respondent endpoint.

14. The non-transitory computer readable storage medium of claim 13, the logic further operable to communicate multimedia information to the first respondent endpoint and the second respondent endpoint by transmitting a plurality of media streams to the first respondent endpoint and the second respondent endpoint, the plurality of media streams comprising at least one of:
a video stream communicating video information;
an audio stream communicating audio information; and
a data stream communicating data information.

15. The non-transitory computer readable storage medium of claim 13, the logic further operable to communicate multimedia information to the first respondent endpoint and the second respondent endpoint by:
launching an application operable to access a data file corresponding to the multimedia information;
accessing the data file using the application to generate the multimedia information; and
sending the multimedia information to the first respondent endpoint and the second respondent endpoint.

16. The non-transitory computer readable storage medium of claim 13, the logic further operable to communicate multimedia information to the first respondent endpoint and the second respondent endpoint by:
accessing an application operable to open a data file in order to generate the multimedia information; and pushing the multimedia information to a first subscriber stub of the first respondent endpoint.

17. The non-transitory computer readable storage medium of claim 13, wherein the rule specifies the first respondent endpoint and the second respondent endpoint.

18. The non-transitory computer readable storage medium of claim 13, wherein:
    the rule specifies data to retrieve for the first respondent endpoint and the second respondent endpoint; and
    the logic is operable to communicate multimedia information to the first respondent endpoint and the second respondent endpoint by:
        retrieving the data to generate the multimedia information; and
        communicating the multimedia information.

19. A method for communicating information to a plurality of respondent endpoints, comprising:
    detecting, by an incident command server comprising hardware and one or more processors, a trigger event for an incident requiring emergency assistance, the trigger event related to an incident category for the incident;
    identifying a rule in accordance with the incident category, wherein the rule is associated with at least one of a plurality of pre-defined incident categories, the rule specifying one or more processes for automatically gathering information for responding to the incident with emergency assistance, at least one of the one or more processes operable to automatically launch an application in response to detecting the trigger, the application operable to access a data file corresponding to multimedia information;
    establishing, by a collaboration server comprising hardware coupled to the incident command server, a collaboration session with a first respondent endpoint and a second respondent endpoint in accordance with the rule, the first respondent endpoint associated with a first respondent system, the second respondent endpoint associated with a second respondent system, the first respondent system and the second respondent system configured to provide the emergency assistance to the incident, the rule specifying the first respondent endpoint and the second respondent endpoint, the rule specifying data to retrieve for the first respondent endpoint and the second respondent endpoint;
    collaborating to provide emergency assistance in response to the incident, the collaborating including:
    gathering a first stream of information and a second stream of information from at least two of the participants of the collaboration session;
    mixing, by a collaboration server, the first and second streams of information to yield multimedia information, the collaboration server distinct from the at least two participants;
    communicating multimedia information to the first respondent endpoint and the second respondent endpoint according to the rule, the multimedia information communicated by:
    launching an application operable to access a data file corresponding to the multimedia information;
    accessing the data file using the application to generate the multimedia information;
    retrieving the data to generate the multimedia information;
    pushing the multimedia information to a first subscriber stub of the first respondent endpoint by transmitting a plurality of media streams to the first respondent endpoint and the second respondent endpoint, the plurality of media streams comprising at least one of:
    a video stream communicating video information;
    an audio stream communicating audio information; and
    a data stream communicating data information; and
    transferring control of the first stream of information to the first respondent endpoint.

* * * * *